(12) United States Patent
Cuevas

(10) Patent No.: US 7,408,744 B1
(45) Date of Patent: Aug. 5, 2008

(54) IMPEDANCE CONTROL WITH REDUCED STIFFNESS CONTRIBUTION FROM ELECTRICAL INTERCONNECT

(75) Inventor: Rafael Cuevas, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 381 days.

(21) Appl. No.: 11/179,208

(22) Filed: Jul. 12, 2005

Related U.S. Application Data

(60) Provisional application No. 60/679,004, filed on May 9, 2005.

(51) Int. Cl.
*G11B 5/48* (2006.01)
(52) U.S. Cl. .................................. 360/244.8
(58) Field of Classification Search .............. 360/244.1, 360/244.8, 245.2, 245.8, 245.9, 246; 29/603.4
See application file for complete search history.

(56) References Cited

U.S. PATENT DOCUMENTS

| | | | | |
|---|---|---|---|---|
| 6,028,742 A | * | 2/2000 | Kazama | ................... 360/244.8 |
| 6,141,187 A | * | 10/2000 | Wong et al. | ............... 360/244.8 |
| 6,249,404 B1 | | 6/2001 | Doundakov et al. | |
| 6,741,426 B2 | * | 5/2004 | Girard | ..................... 360/245.4 |
| 6,944,936 B2 | * | 9/2005 | Krinke | .................... 29/603.04 |
| 2006/0152854 A1 | * | 7/2006 | Arya et al. | ............... 360/245.9 |
| 2006/0245112 A1 | * | 11/2006 | Shum | ...................... 360/245.9 |

* cited by examiner

*Primary Examiner*—Tianjie Chen
(74) *Attorney, Agent, or Firm*—Intellectual Property Law Office of Joel D. Voelzke

(57) ABSTRACT

Method and apparatus for reduced contribution to suspension hinge stiffness of an electrical interconnect metal layer while retaining substantial impedance reductions from the metal layer use a sinuous pattern of removed and retained subregions of the metal layer selectively and distributively to ease bending of the metal layer and decrease its stiffness contribution while the retained metal layer subregions provide a substantial proportion of the impedance reduction normally provided by the metal layer.

19 Claims, 3 Drawing Sheets

US 7,408,744 B1

IMPEDANCE CONTROL WITH REDUCED STIFFNESS CONTRIBUTION FROM ELECTRICAL INTERCONNECT

CROSS-REFERENCE TO RELATED APPLICATIONS

This application claims the benefit of U.S. Provisional Application Ser. No. 60/679,004, filed May 9, 2005.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions. More particularly, the invention is concerned with suspensions having an electrical interconnect of trace conductors, an insulator and a metal layer traversing the suspension spring portion or hinge. In such suspensions, the interconnect, particularly the metal layer thereof, contributes unwanted added stiffness to the spring portion. The metal layer, however, serves to control impedance in the conductive traces.

2. Description of the Related Art

Lessening the stiffness contribution of electrical interconnect metal layers by complete removal thereof or by opening a large aperture in the metal layer eliminates or greatly lessens the stiffness contribution but impedance control suffers. From a mechanical point of view, the suspension spring portion comprising a hinge defining a bending zone is desirably as flexible as possible. Using a large aperture in the ground layer-defining interconnect metal layer is a solution often used, although this causes changes in the impedance value in the interconnect and creates a $Z_0$ mismatch between the amplifier and the slider, and cross talk between traces.

BRIEF SUMMARY OF THE INVENTION

In order to lessen the stiffness contribution of the interconnect while retaining a substantial proportion of the impedance reduction normally provided by the metal layer, the invention multiply, distributively and locally relieves the metal layer in a substantially sinuous pattern of removed and retained subregions in place of one or two large apertures. A sinuous pattern herein is one that bends, curves and/or twists through the metal layer along an imaginary line intersecting in progressive or random sequence substantially all the several removed subregions leaving between adjacent ones of such removed subregions a more easily bendable isthmus of metal layer material, termed a retained subregion herein. The imaginary line can be continuous and smoothly curved and connect continuously communicated removed subregions as in the serpentine embodiment hereof, or discontinuous and sharply angled between successive removed subregions. Any impedance increase from the removal of removed subregions is minimized through retention everywhere surrounding the removed subregions of retained subregions of the metal layer defining the ground plane.

The apertures can have different positions, shapes, and dimensions depending on the particular application, but the overall objective is to remove significant quantities of metal from the metal layer, 25% to 75%, and preferably about 50% of the metal layer area traversing the suspension spring portion, and to distribute the removed subregions amongst retained subregions to minimize impedance changes while reducing substantially the stiffness contribution of the metal layer.

It is an object of the invention to provide an improved disk drive suspension. It is a further object to greatly reduce the stiffness contribution of an electrical interconnect metal layer to the suspension spring portion hinge while continuing to control impedance to provide a substantial proportion of the impedance reduction normally provided by the metal layer. Another object is to only locally relieve the metal layer to effect stiffness reduction and maintain substantial impedance benefits. A further object is to provide a sinuous pattern of removed subregions in the metal layer for stiffness amelioration surrounded by retained subregions that provide impedance control. Further objects include providing methods of controlling impedance in an interconnect, while reducing the interconnect metal layer added contribution to spring portion stiffness.

These and other objects of the invention to become apparent hereinafter are realized in a disk drive suspension comprising a base portion, a spring portion having a given stiffness and including a hinge, the hinge being supported by the base portion, and a beam portion supported by the hinge, an electrical interconnect comprising a metal layer and plural pairs of conductive traces separated from the metal layer by an insulative layer, the electrical interconnect being supported by the suspension and having a metal layer section traversing the hinge, the metal layer section when unrelieved tending to desirably decrease electrical interconnect impedance in the conductive traces but undesirably add stiffness to the spring portion, the metal layer section being multiply and distributively locally relieved in a substantially sinuous pattern of removed and retained subregions to bend more readily than the unrelieved metal layer section thereby to lessen the stiffness added to the spring portion by the unrelieved metal layer section in greater proportion than the pattern decreases impedance reductions in the conductive traces effected by the unrelieved metal layer section.

In this and like embodiments, typically, each removed subregion continuously opposes a single trace for not more than three times the width of a trace pair, the metal layer section has its metal removed at parallel, opposed, spaced and distributed multiple removed subregions thereof, each removed subregion traversing at least one of the pairs of traces to define the local relief while retaining the metal layer section at other retained subregions thereof between and around the removed subregions, or the metal layer section has its metal removed at parallel, opposed, spaced and distributed multiple removed subregions thereof, each removed subregion traversing both of the pairs of traces to define the local relief while retaining the metal layer section at other retained subregions thereof between and around the removed subregions, and/or the metal layer section has its metal removed at parallel, opposed, spaced and distributed elongate multiple removed subregions thereof, each removed subregion traversing at least one of the pairs of traces to define the local relief while retaining the metal layer section at other retained subregions thereof between and around the removed subregions, or the metal layer section has its metal removed at parallel, opposed, spaced and distributed elongate multiple removed subregions thereof, each removed subregion traversing both of the pairs of traces to define the local relief while retaining the metal layer section at other retained subregions thereof between and around the removed subregions, or the metal layer section has its metal removed at parallel, staggered, spaced and distributed multiple removed subregions thereof, each removed subregion traversing at least one of the pairs of traces to define the local relief while retaining the metal layer section at other retained subregions thereof between and around the removed subregions, or the metal layer section has its metal removed at parallel, staggered, spaced and distributed multiple removed subregions thereof, each removed subregion traversing both of the pairs of traces to define the local relief while retaining the metal layer section at other retained subregions thereof between and around the removed subregions, or the metal layer section has its metal removed at parallel, staggered, spaced and distributed first and second ranks of elongate multiple removed subregions thereof, each removed subregion traversing respectively first and second pairs of traces to define the local relief while retaining the metal layer section at other retained subregions thereof between and around the removed subregions, or the metal layer section has its metal removed at serpentine arrayed, spaced and distributed elongate multiple removed subregions thereof, each removed subregion traversing at least one of the pairs of traces to define the local relief while retaining the metal layer section at other retained subregions thereof between and around the removed subregions, or the metal layer section has its metal removed at serpentine arrayed, spaced and distributed alternately first and second ranks of elongate multiple removed subregions thereof, the removed subregions alternately traversing respectively first and second pairs of traces to define the local relief while retaining the metal layer section at other retained subregions thereof between and around the removed subregions, or the metal layer section has its metal removed at parallel, spaced and distributed multiple circular removed subregions thereof, each removed subregion traversing at least one of the pairs of traces to define the local relief while retaining the metal layer section at other retained subregions thereof between and around the removed subregions, and/or the plural pairs of conductive traces include read conductive traces and write conductive traces, the removed subregions being differentially sized for the read conductive traces and the write conductive traces.

In a further embodiment, the invention provides a disk drive suspension comprising a base portion, a spring portion having a stiffness and including a hinge, the hinge being supported by the base portion, and a beam portion supported by the hinge, an electrical interconnect comprising a metal layer and plural pairs of conductive traces separated from the metal layer by an insulative layer, the electrical interconnect being supported by the suspension and having a metal layer section at least partially opposite the hinge that adds a contribution to hinge portion stiffness and proximate to the conductive traces in impedance reducing relation, the metal layer section being locally relieved in a serpentine pattern comprising multiple, distributed, communicating removed subregions totaling at least 25% of the metal layer section to decrease the section added stiffness contribution, up to 75% of the metal layer section being retained to provide retained subregions proximate to substantially all of the conductive traces at the spring portion, whereby proportionately more of the impedance reductions provided by the metal layer section are retained and proportionately less of the metal layer section added stiffness contribution is retained.

In this and like embodiments, typically, the removed subregions traverse at least one of the pairs of traces to define the local relief while retaining the metal at other retained subregions thereof between and around the removed subregions, the metal layer section removed subregions are elongate and continue into each other to traverse at least one of the pairs of traces to define the local relief while retaining the metal at other retained subregions thereof between and around the removed subregions, and/or the metal layer section removed subregions are elongate and distributed into first and second ranks that alternately traverse respectively the first and second the pairs of traces to define the local relief while retaining the metal at other retained subregions thereof between and around the removed subregions.

The invention method includes in one embodiment decreasing the added spring portion stiffness contribution to a disk drive suspension spring portion of a metal layer section of an electrical interconnect having conductive traces and traversing the spring portion while decreasing proportionately less of the impedance reduction afforded by the metal layer section, including removing metal layer section metal subregions opposite the hinge portion locally, selectively and distributively in a substantially sinuous pattern having lowered bending resistance than the precursor metal layer section while retaining metal layer metal subregions between removed subregions and opposite the conductive traces.

In a further embodiment, the invention method includes decreasing an added spring portion stiffness contribution to a disk drive suspension spring portion from a metal layer section of an electrical interconnect having conductive traces and traversing the spring portion while decreasing proportionately less of the impedance reduction afforded by the metal layer section, including removing metal layer section metal subregions opposite the hinge portion locally, selectively and distributively in a continuous serpentine pattern having lowered bending resistance than the precursor metal layer section while retaining metal layer metal subregions between removed subregions and opposite the conductive traces.

BRIEF DESCRIPTION OF THE SEVERAL VIEWS OF THE DRAWINGS

The invention will be further described in conjunction with the attached drawings in which.

DETAILED DESCRIPTION OF THE INVENTION

Figure 1:
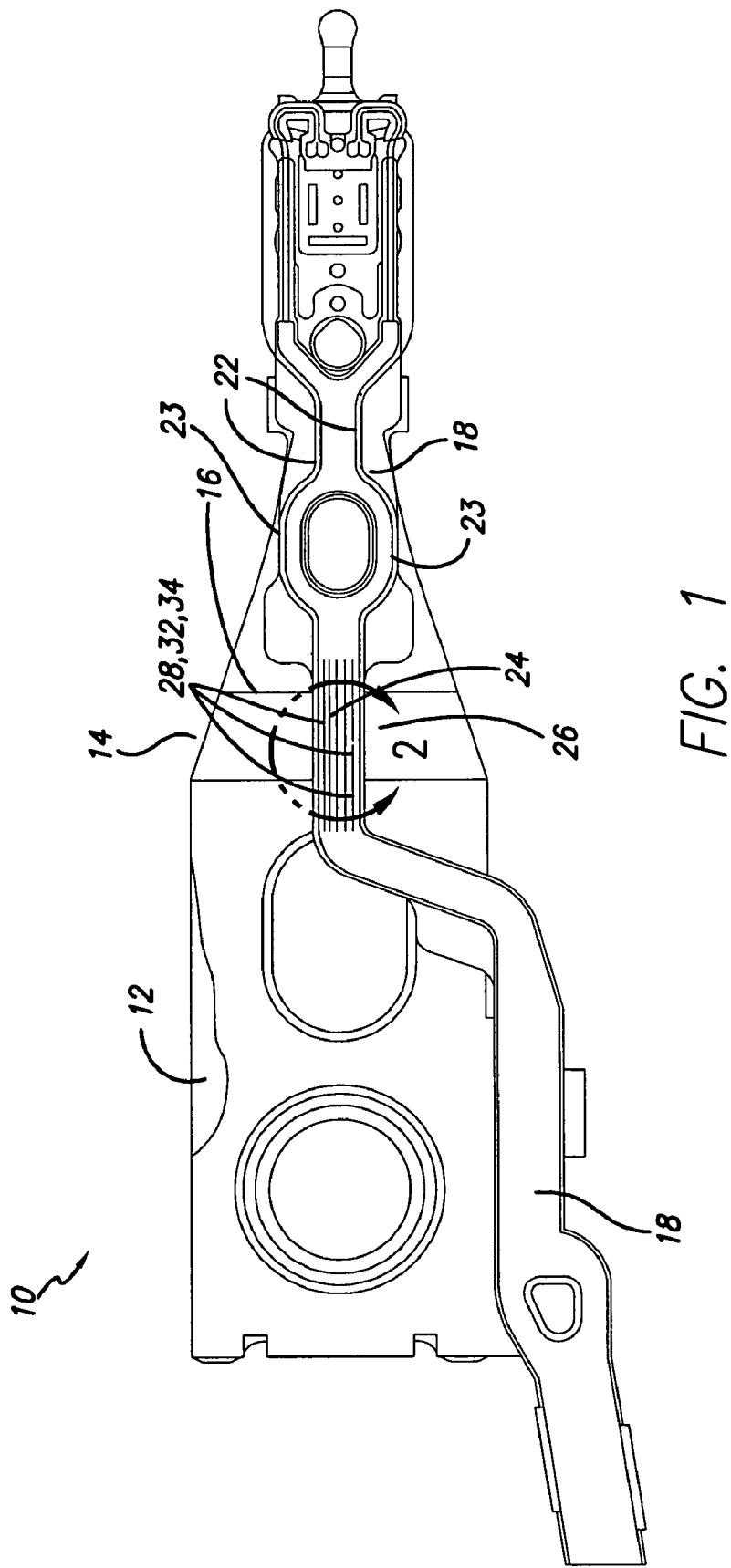
FIG. 1 is a plan view of a disk drive suspension according to the invention.
Figure 2:
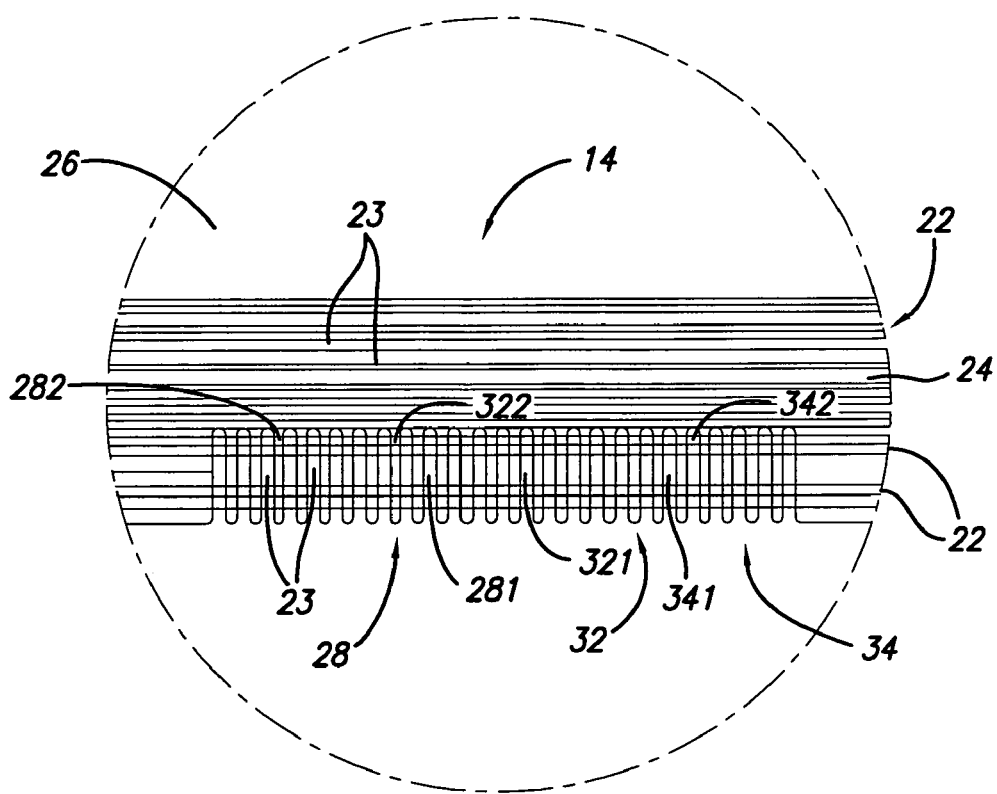
FIG. 2 is a view taken on line 2 in FIG. 1.

With reference now to the drawings in detail, in FIGS. 1 and 2 disk drive suspension 10 comprises a base portion 12, a spring metal hinge portion 14 having a given stiffness and including a hinge 15. Hinge 15 is supported by the base portion 12. Suspension beam portion 16 is supported by the hinge 15. An electrical interconnect 18, supported by the suspension 10, comprises a metal layer 17, an insulative layer 19 and plural pairs 22 of conductive traces 23 separated from the metal layer by the insulative layer. Electrical interconnect 18 has a metal layer section 24 generally opposite and traversing the hinge 15. Metal layer section 24 when unrelieved tends to desirably decrease electrical interconnect impedance in the conductive traces 23 but undesirably add stiffness to the spring portion 14. In accordance with the invention, the metal layer section 24 is multiply and distributively locally, relieved, e.g. at 28, 32 and 34 across one or both pairs 22 of the conductive traces 23. Relief 28 is in a substantially sinuous pattern 25 of removed subregions 281, 321 and 341, etc. and retained subregions 282, 322 and 342, etc. to bend more readily than the unrelieved metal layer section 24 thereby to lessen the stiffness added to the spring portion 14 by the unrelieved metal layer section in greater proportion than the pattern decreases impedance reductions in the conductive traces 23 effected by the unrelieved metal layer section.

As noted above, typically, each removed subregion 281, 321 and 341 continuously opposes a single trace 23 for not more than three times the width of a trace pair 22. Metal layer section 24 has its metal removed at parallel, opposed, spaced and distributed multiple removed subregions 281, 321 and 341 thereof. Preferably, each removed subregion 281, 321 and 341 traverses at least one of the pairs 22 of traces 23 as shown in FIG. 2, to define the local relief 28, while retaining the metal layer section 24 at other, retained subregions 282, 322 and 342 thereof between and around the removed subregions.

Figure 3:
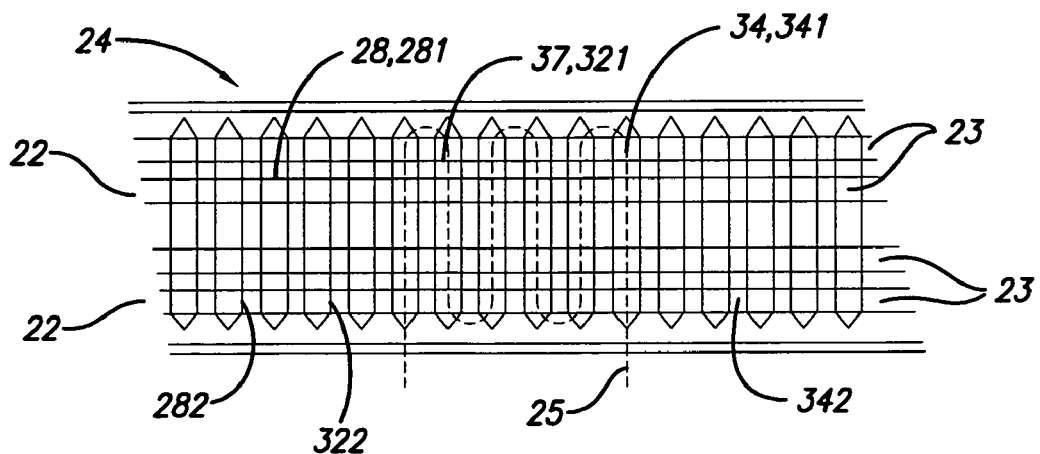
FIG. 3 is view like FIG. 2 of an alternate arrangement of removed and retained subregions.

In FIG. 3 metal layer section 24 has its metal removed at parallel, opposed, spaced and distributed, preferably elongated, multiple removed subregions 281, 321 and 341, etc. thereof, each removed subregion traversing both pairs 22 of traces 23 to define the local relief 28 while retaining the metal layer section at other, retained subregions 282, 322 and 342 thereof between and around the removed subregions.

Figure 4:
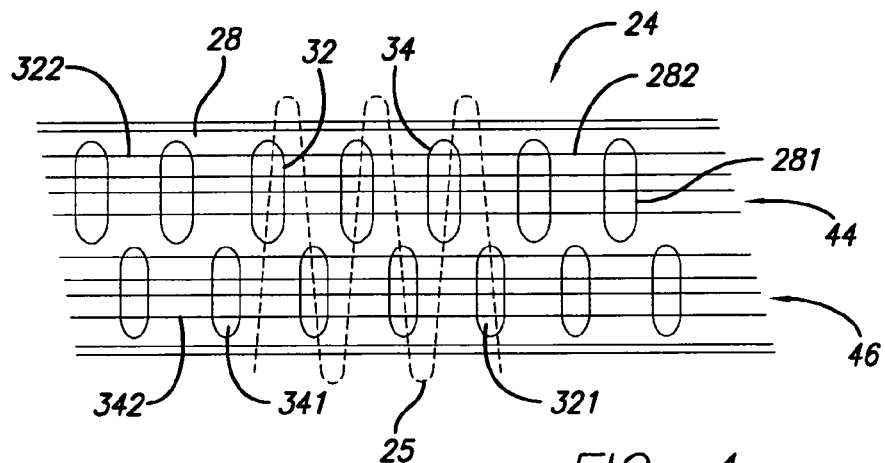
FIG. 4 is view like FIG. 2 of an alternate arrangement of removed and retained subregions.

In FIG. 4 metal layer section 24 has its metal removed at parallel, staggered, spaced and distributed multiple removed subregions 281, 321 and 341 thereof, each removed subregion traversing one or both of the pairs 22 of traces 23 to define the local relief 28 while retaining the metal layer section at other, retained subregions 282, 322 and 342 thereof between and around the removed subregions. As also shown in FIG. 4 the plural pairs 22 of conductive traces 23 include read conductive traces 231 and write conductive traces 232 with the removed subregions 2811, 2812 being differentially sized for the read conductive traces and the write conductive traces.

Further in FIG. 4 the metal layer section 24 has its metal removed at parallel, staggered, spaced and distributed first and second ranks 44, 46 of elongate multiple removed subregions 281, 321 and 341 thereof, each removed subregion traversing respectively first and second pairs 22 of traces 23 to define the local relief 28 while retaining the metal layer section at other, retained subregions 282, 322 and 342 thereof between and around the removed subregions.

Figure 5:
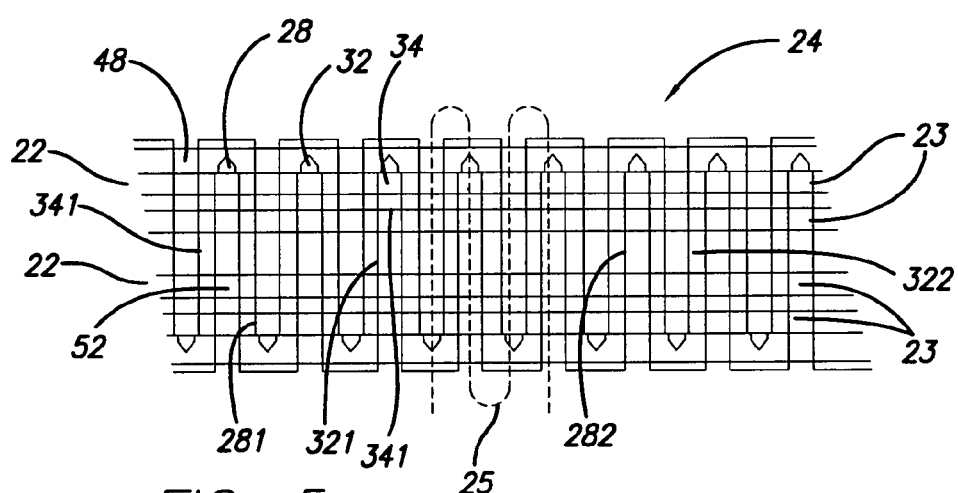
FIG. 5 is view like FIG. 2 of an alternate arrangement of removed and retained subregions; and, FIG. 6 is view like FIG. 2 of an alternate arrangement of removed and retained subregions.

In FIG. 5 metal layer section 24 has its metal removed at serpentine arrayed, spaced and distributed elongate multiple removed subregions 281, 321 and 341 thereof, each removed subregion traversing at least one pair 22 of traces 23 to define the local relief 28 while retaining the metal layer section at other, retained subregions 282, 322 and 342 thereof between and around the removed subregions. Preferably, the metal layer section 24 serpentine arrayed, spaced and distributed removed subregions 281, 321 and 341 are arranged alternately in first and second ranks 48, 52 to alternately traverse respectively first and second pairs 221, 222 of traces 23 to define the local relief 28 while retaining the metal layer section at other, retained subregions.

Figure 6:
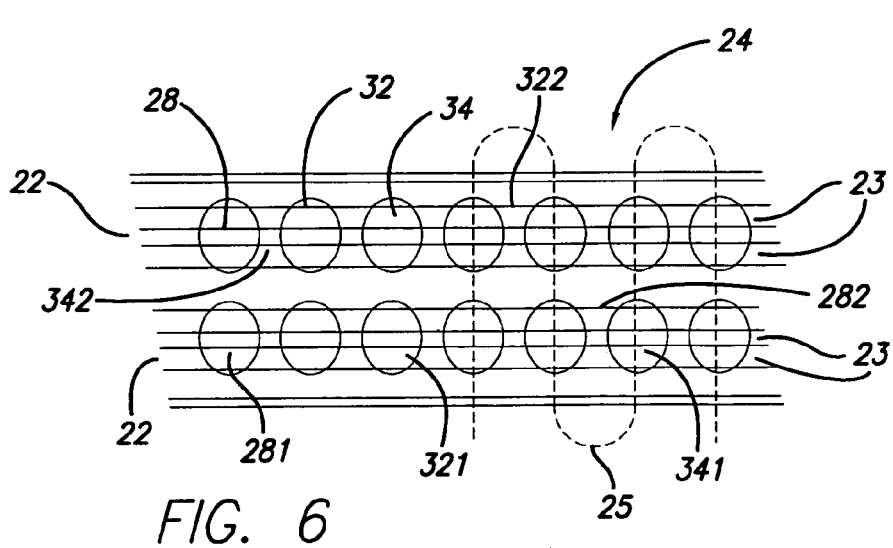

In FIG. 6 the metal layer section 24 has its metal removed at parallel, spaced and distributed multiple circular removed subregions 281, 321 and 341 thereof, each removed subregion traversing at least one of the pairs 22 of traces 23 to define the local relief 28 while retaining the metal layer section at other, retained subregions 282, 322 and 342 thereof between and around the removed subregions.

In a preferred embodiment, disk drive suspension 10 comprises a base portion 12, a spring hinge portion 14 having a stiffness and including a hinge 15, the hinge being supported by the base portion, and a beam portion 16 supported by the hinge, an electrical interconnect 18 comprising a metal layer 17 and plural pairs 22 of conductive traces 23 separated from the metal layer by an insulative layer 19. Electrical interconnect 18 is supported by the suspension 10 and has a metal layer section 24 at least partially opposite the hinge 15 that adds a contribution to hinge portion 14 stiffness and proximate to the conductive traces in impedance reducing relation. The metal layer section 24 is locally relieved at 28 in a serpentine pattern 25 comprising multiple, distributed, communicating removed subregions 281, 321 and 341 totaling at least 25% of the metal layer section to decrease the section added stiffness contribution, up to 75% of the metal layer section being retained to provide retained subregions 282, 322 and 342 proximate to substantially all of the conductive traces 23 at the spring hinge portion. Thus arranged, proportionately more of the impedance reductions provided by the metal layer section 24 are retained and proportionately less of the metal layer section added stiffness contribution is retained.

Typically in this and like embodiments, the removed subregions 281, 321 and 341 traverse at least one of the pairs 22 of traces 23 to define the local relief 28 while retaining the metal at other, retained subregions 282, 322 and 342 thereof between and around the removed subregions. The metal layer section removed subregions 281, 321 and 341 are elongate and continue into each other in open communication therebetween to traverse at least one pair 22 of traces 23 to define the local relief 28 while retaining the metal at other, retained subregions 282, 322 and 342 thereof between and around the removed subregions, suitably arranged into first and second ranks 48, 52 that alternately traverse respectively the first and second pairs of traces 231, 232 to define the local relief 28 while retaining the metal at other, retained subregions 282, 322 and 342.

In its method aspects, the invention includes decreasing the added spring portion stiffness contribution to a disk drive suspension spring hinge portion 14 of a metal layer section 24 of an electrical interconnect 18 having conductive traces 23 and traversing the spring portion while decreasing proportionately less of the impedance reduction afforded by the metal layer section, removing metal layer section metal subregions 281, 321 and 341 opposite the hinge portion locally, selectively and distributively in a substantially sinuous, and preferably serpentine, pattern 25 having lowered bending resistance than the precursor metal layer section while retaining metal layer metal subregions 282, 322 and 342 between removed subregions and opposite the conductive traces 23.

To illustrate the improvements afforded by the invention, three Prior Art suspensions were modeled and compared with embodiments of the invention, using 50% removed and 50% (by area) subregions in the FIGS. 3, 4, and 6, and 30% removed and 70% retained in FIG. 5. It will be noted that impedance control was largely maintained with generally less increase in impedance in the invention embodiments than in the Prior Art suspensions. This impedance control was coupled with substantial reductions in the stiffness contribution from the interconnect, including primarily the interconnect metal layer. The Figure of Merit is calculated by taking the change (decrease) in stiffness contribution plus 1 and dividing by the change (reduction) in impedance plus 1, to relate the disproportion in change obtained in the invention. The FIG. 5 embodiment was best, primarily due to a very low stiffness contribution.

TABLE

| FIG. Number | $Z_o$ Write | $Z_o$ Read | $Z_o$ Write Increase % Comp to (A) | $Z_o$ Read Increase % Comp to (A) | Inter-Connect Stiffness Added Contrib % | FIG. of Merit |
|---|---|---|---|---|---|---|
| None* (A) | 78.0 | 51.0 | 0% | 0% | 5.10% | 1.000 |
| None** (B) | 123.0 | 84.0 | 58% | 65% | 1.50% | 1.525 |
| None*** (C) | 78.0 | 51.0 | 0% | 0% | 4.70% | 1.085 |
| 3 | 101.5 | 68.0 | 30% | 33% | 2.40% | 1.304 |
| 4 | 93.7 | 62.3 | 20% | 22% | 3.00% | 1.197 |
| 5 | 101.5 | 68.0 | 30% | 33% | 0.40% | 7.822 |
| 6 | 116.5 | 78.9 | 49% | 55% | 3.58% | 0.698 |
| 2 | 78.0 | 68.0 | 0% | 33% | 3.70% | 1.036 |

*Prior Art, No metal layer aperture.
**Prior Art, A single large transverse aperture opposite a major part of the hinge portion.
***Prior Art, A single large longitudinal aperture opposite a major part of the hinge portion.

The invention thus provides an improved disk drive suspension with a greatly reduced stiffness contribution of the electrical interconnect metal layer to the suspension spring portion hinge stiffness while continuing to control impedance to provide a substantial proportion of the impedance reduction normally provided by the metal layer. Only local relief of the metal layer is used to effect stiffness reduction and maintain substantially impedance benefits, with a sinuous pattern of removed subregions in the metal layer for stiffness amelioration surrounded by retained subregions that provide impedance control.

The foregoing objects are thus met.

I claim:

1. A disk drive suspension comprising a base portion, a spring portion having a given stiffness and including a hinge, said hinge being supported by said base portion, and a beam portion supported by said hinge, an electrical interconnect comprising a metal layer and plural pairs of conductive traces separated from said metal layer by an insulative layer, said electrical interconnect being supported by said suspension and having a metal layer section traversing said hinge, said metal layer section when unrelieved tending to desirably decrease electrical interconnect impedance in said conductive traces but undesirably add stiffness to said spring portion, said metal layer section being multiply and distributively locally relieved in a substantially sinuous pattern of removed and retained subregions to bend more readily than said unrelieved metal layer section thereby to lessen the stiffness added to said spring portion by said unrelieved metal layer section in greater proportion than said pattern decreases impedance reductions in said conductive traces effected by said unrelieved metal layer section.

2. The disk drive suspension according to claim 1, in which each said removed subregion continuously opposes a single trace for not more than three times the lateral width of a trace pair.

3. The disk drive suspension according to claim 1, in which said metal layer section has its metal removed at parallel, opposed, spaced and distributed multiple removed subregions thereof, each said removed subregion traversing at least one of said pair of traces to define said local relief while retaining said metal layer section at other retained subregions thereof between and around said removed subregions.

4. The disk drive suspension according to claim 1, in which said metal layer section has its metal removed at parallel, opposed, spaced and distributed multiple removed subregions thereof, each said removed subregion traversing said pairs of traces to define said local relief while retaining said metal layer section at other retained subregions thereof between and around said removed subregions.

5. The disk drive suspension according to claim 1, in which said metal layer section has its metal removed at parallel opposed, spaced and distributed elongate multiple removed subregions thereof, each said removed subregion traversing at least one said pair of traces to define said local relief while retaining said metal layer section at other retained subregions thereof between and around said removed subregions.

6. The disk drive suspension according to claim 1, in which said metal layer section has its metal removed at parallel, opposed, spaced and distributed elongate multiple removed subregions thereof, each said removed subregion traversing said pairs of traces to define said local relief while retaining said metal layer section at other retained subregions thereof between and around said removed subregions.

7. The disk drive suspension according to claim 1, in which said metal layer section has its metal removed at parallel, staggered, spaced and distributed multiple removed subregions thereof, each said removed subregion traversing at least one of said pair of traces to define said local relief while retaining said metal layer section at other retained subregions thereof between and around said removed subregions.

8. The disk drive suspension according to claim 1, in which said metal layer section has its metal removed at parallel, staggered, spaced and distributed multiple removed subregions thereof, each said removed subregion traversing both said pairs of traces to define the local relief while retaining said metal layer section at other retained subregions thereof between and around said removed subregions.

9. The disk drive suspension according to claim 1, in which said metal layer section has its metal removed at parallel, staggered, spaced and distributed first and second ranks of elongate multiple removed subregions thereof, each said removed subregion traversing respectively first and second pairs of traces to define said local relief while retaining said metal layer section at other retained subregions thereof between and around said removed subregions.

10. The disk drive suspension according to claim 1, in which said metal layer section has its metal removed at serpentine arrayed, spaced and distributed elongate multiple removed subregions thereof, each said removed subregion traversing at least one said pair of traces to define said local relief while retaining said metal layer section at other retained subregions thereof between and around said removed subregions.

11. The disk drive suspension according to claim 1, in which said metal layer section has its metal removed at serpentine arrayed, spaced and distributed alternately first and second ranks of elongate multiple removed subregions thereof, said removed subregions alternately traversing respectively first and second pairs of traces to define said local relief while retaining said metal layer section at other retained subregions thereof between and around said removed subregions.

12. The disk drive suspension according to claim 1, in which said metal layer section has its metal removed at parallel, spaced and distributed multiple circular removed subregions thereof, each said removed subregion traversing at least one of said pair of traces to define said local relief while retaining said metal layer section at other retained subregions thereof between and around said removed subregions.

13. The disk drive suspension according to claim 1, in which said plural pairs of conductive traces include read conductive traces and write conductive traces, said removed subregions being differentially sized for said read conductive traces and said write conductive traces.

14. A disk drive suspension comprising a base portion, a spring portion having a stiffness and including a hinge, said hinge being supported by said base portion, and a beam portion supported by said hinge, an electrical interconnect comprising a metal layer and plural pairs of conductive traces separated from said metal layer by an insulative layer, said electrical interconnect being supported by said suspension and having a metal layer section at least partially opposite said hinge that adds a contribution to hinge portion stiffness and proximate to said conductive traces in impedance reducing relation, said metal layer section being locally relieved in a serpentine pattern comprising multiple, distributed, communicating removed subregions cumulatively totaling at least 25% of said metal layer section to decrease said section added stiffness contribution, up to 75% of said metal layer section being retained to provide retained subregions proximate to substantially all of said conductive traces at said spring portion, whereby proportionately more of the impedance reductions provided by said metal layer section are retained and proportionately less of said metal layer section added stiffness contribution is retained.

15. The disk drive suspension according to claim 14, in which said removed subregions traverse at least one of said pair of traces to define said local relief while retaining said metal at other retained subregions thereof between and around said removed subregions.

16. The disk drive suspension according to claim 14, in which said metal layer section removed subregions are elongate and continue into each other to traverse at least one said pair of traces to define said local relief while retaining said metal at other retained subregions thereof between and around said removed subregions.

17. The disk drive suspension according to claim 14, in which said metal layer section removed subregions are elongate and distributed into first and second ranks that alternately traverse respectively first and second said pairs of traces to define said local relief while retaining said metal at other retained subregions thereof between and around said removed subregions.

18. A method of decreasing an added spring portion stiffness contribution to a disk drive suspension spring portion from a metal layer section of an electrical interconnect having conductive traces and traversing said spring portion while decreasing proportionately less of the impedance reduction afforded by said metal layer section, including removing metal layer section metal subregions opposite said spring portion locally, selectively and distributively in a substantially sinuous pattern having lowered bending resistance than the precursor metal layer section while retaining metal layer metal subregions between removed subregions and opposite said conductive traces.

19. A method of decreasing an added spring portion stiffness contribution to a disk drive suspension spring portion from a metal layer section of an electrical interconnect having conductive traces and traversing said spring portion while decreasing proportionately less of the impedance reduction afforded by said metal layer section, including removing metal layer section metal subregions opposite said spring portion locally, selectively and distributively in a continuous serpentine pattern having lowered bending resistance than the precursor metal layer section while retaining metal layer metal subregions between removed subregions and opposite said conductive traces.

* * * * *

UNITED STATES PATENT AND TRADEMARK OFFICE
CERTIFICATE OF CORRECTION

PATENT NO. : 7,408,744 B1  Page 1 of 1
APPLICATION NO. : 11/179208
DATED : August 5, 2008
INVENTOR(S) : Rafael Cuevas It is certified that error appears in the above-identified patent and that said Letters Patent is hereby corrected as shown below:

In claim 3, column 8, line 1, delete "pair" and insert --pairs--.

In claim 7, column 8, line 29, delete "pair" and insert --pairs--.

In claim 12, column 9, line 1, delete "pair" and insert --pairs--.

In claim 15, column 9, line 32, delete "pair" and insert --pairs--.

Signed and Sealed this

Twenty-third Day of September, 2008

JON W. DUDAS
*Director of the United States Patent and Trademark Office*